United States Patent [19]

Johnson et al.

[11] 3,729,980
[45] May 1, 1973

[54] HYDRODYNAMIC SHOCK SIMULATOR

[75] Inventors: Cameron D. Johnson, Mystic; Gerald M. Mayer, East Lyme; Roger L. Morency, Voluntown, all of Conn.

[73] Assignee: The United States of America as represented by the Secretary of the Navy

[22] Filed: Mar. 2, 1972

[21] Appl. No.: 231,272

[52] U.S. Cl. ................................................73/12
[51] Int. Cl. ...........................................G01n 3/30
[58] Field of Search ..........................73/12, 49.4

[56] References Cited

UNITED STATES PATENTS 2,539,418   1/1951   Grogan ........................... 73/12 X
2,696,105   12/1954  Mackas ............................. 73/12
2,610,504   9/1952   Nigh ................................. 73/12

Primary Examiner—James J. Gill
Attorney—Richard S. Sciascia et al.

[57] ABSTRACT

A hydrodynamic shock simulator for providing an underwater explosive shock environment for a sonar transducer under test. The simulator comprises a mechanically driven accelerator which drives a projectile. The moving projectile then hits a piston in a tank full of an incompressible fluid, thus producing a pressure wave of small duration in the tank housing a sonar transducer under test. Any distortion of the pressure wave due to its reflection at the end farther away from the piston is limited by a shock absorber in the end of the tank.

6 Claims, 4 Drawing Figures

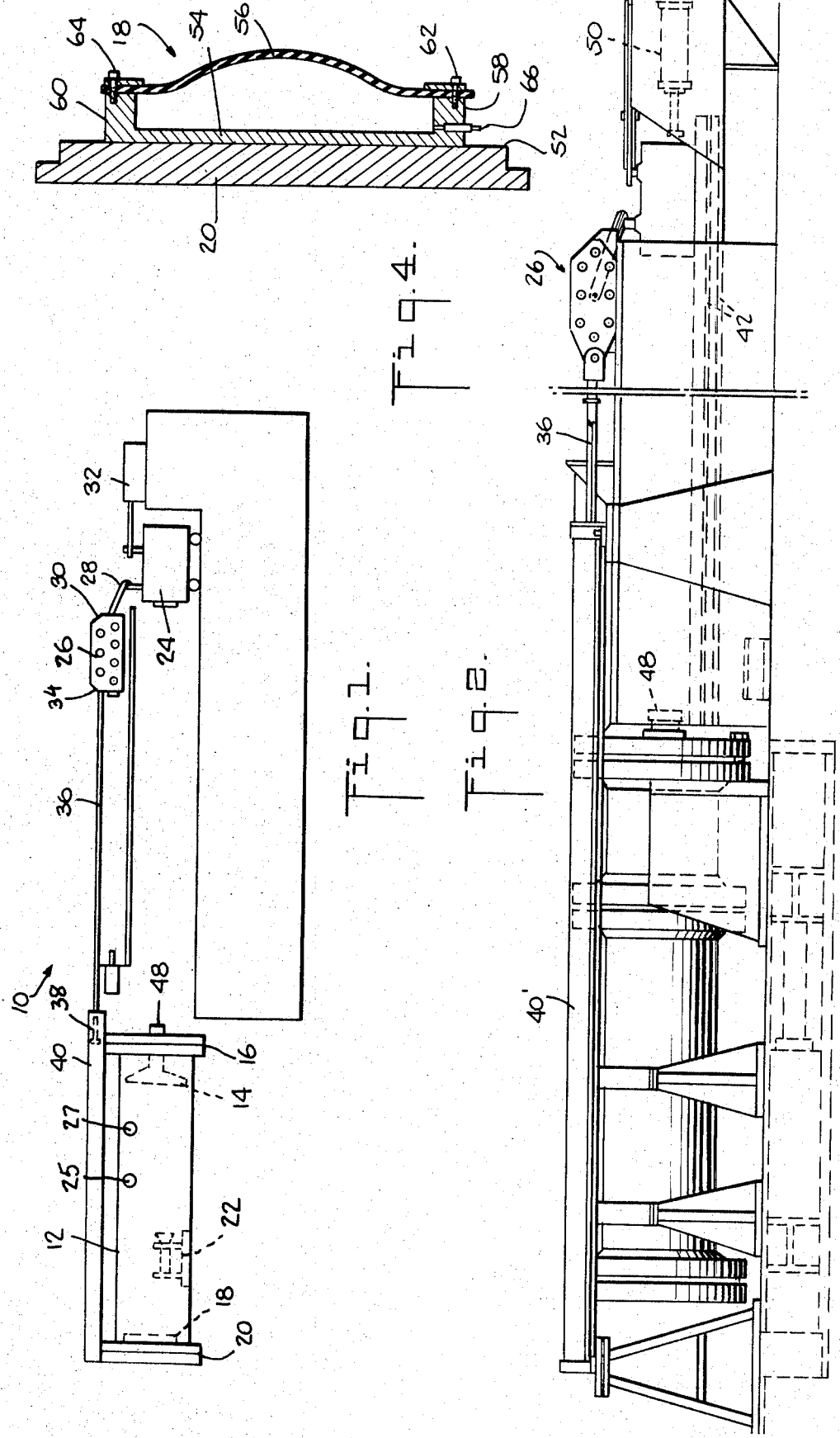

HYDRODYNAMIC SHOCK SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to shock wave generators in general, and more particularly to hydrodynamics shock wave simulators for testing sonar transducers under conditions similar to those underwater when such transducers are used.

Most of the means for shock simulations in the past have been mechanical shock simulators which include light-weight and medium-weight high impact machines. These machines strike the face of the transducer under test. However, such a direct impact on the face of the transducer has an undesirable effect on the response of the transducer. Furthermore, it is difficult to get a plane shock wave striking the transducer with these impact machines. Some hydraulic shock devices have also been used in the past, but they do not provide a realistic simulation. One example of such a shock device is a "drop-type" hydraulic shock machine wherein the transducer to be tested is placed into a small tank and a weight is dropped onto a piston that extends into the tank. However, the small size of the tank precludes any possibility of a traveling pressure or shock wave. Furthermore, the pressure wave is of long duration, it being a compression wave with peak pressures of several thousand pounds per square inch, hereinafter abbreviated as "psi," and a duration of several milliseconds. Thus, the pressure wave so produced does not provide a realistic simulation.

SUMMARY OF THE INVENTION

The hydraulic shock simulator of this invention is used for testing sonar transducers under simulated underwater conditions. The simulator comprises a heavy projectile movable on tracks, a fluid driven accelerator which is disengagably connected to the projectile, a tank filled with an incompressible fluid such as water and fitted with a piston on one of its ends and a shock absorber on the opposite end thereof. The tank has also provisions for housing the transducers under test and pressure gauges to measure the amplitude of the shock waves produced. The projectile is connected to the accelerator with a tow hook and is freed from its normally restrained position before starting the cycle of operation. The accelerator is then accelerated by a gaseous charge, thus accelerating the projectile therewith. The accelerator is disengaged upon collision with a shock absorber, whereas the projectile keeps on moving until it hits the piston and produces a shock wave. The shock wave travels through the medium in the tank and energizes the transducer under test. Any distortion of the shock wave due to any reflection of the shock wave at the other end of the tank is limited by the shock absorber fitted thereon.

It is an object of the invention to produce a distortion free shock wave for testing sonar transducers simulating actual sea conditions.

Another object of the invention is to provide a hydrodynamic shock simulator which produces a pressure wave of short duration.

Still another object of the invention is to provide a hydrodynamic shock simulator having a piston of special configuration which produces a plane pressure wave when a heavy projectile impinges thereon.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a schematic drawing of the simulator; FIG. 2 is a vertical cross section of the simulator showing the relationship of various components thereof; FIG. 4 is an enlarged view of a portion of the cross section of FIG. 3 showing a pressure wave reflection absorber of the simulator.

DESCRIPTION OF A PREFERRED EMBODIMENT

Figure 3:
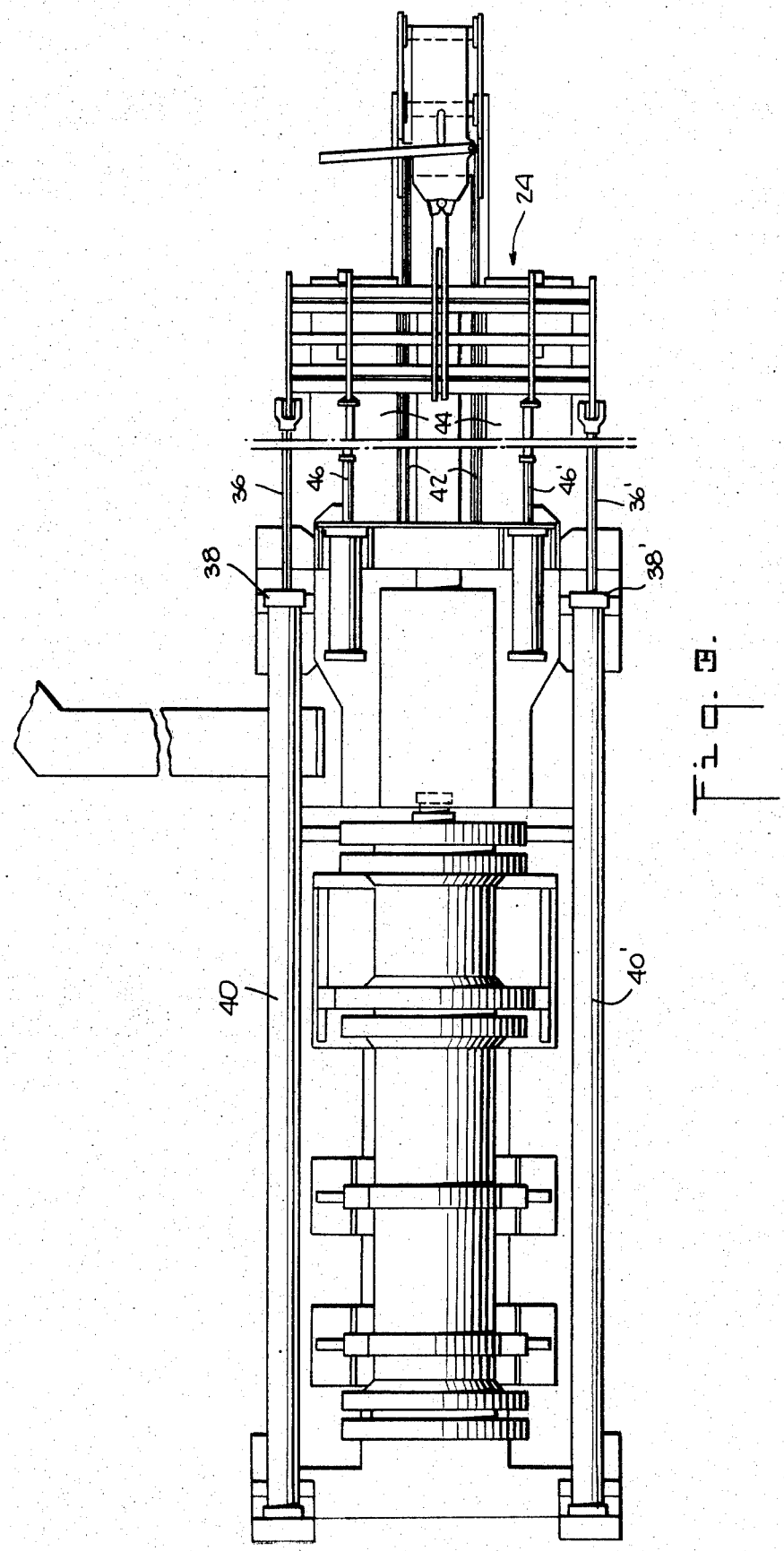
FIG. 3 is a horizontal cross section of the simulator.

In the illustrated embodiment of FIG. 1, a hydrodynamic shock simulator 10 comprises a tank 12 which houses a piston 14 at one end 16 of tank 12 and a pressure wave reflection absorber 18 on the other end 20 of tank 12. Tank 12 also houses a transducer 22 which is under test. An incompressible fluid such as water fills the tank 12 to simulate the conditions under which the transducer 22 is to be tested. Two pressure gauges designated by numerals 25 and 27 are housed in the tank to measure the amplitude and velocity of the pressure wave. The simulator further comprises a projectile 24 and an accelerator 26 coupled to the projectile with a disengagable tow hook 28 at its one end 30. The projectile 24 is normally held in position by a restraining mechanism 32. The accelerator 26 is coupled at its other end 34 to rod 36 of a piston 38, which moves back and forth in an accelerator tank 40. The length of the accelerator tank 40 is such that it has enough space for a precharge inside the accelerator tank 40 besides accommodating the full length of rod 36.

In operation, with the projectile 24 held in position by the restraining device 32, pressure is built up in the precharge by using an inert gas such as carbon dioxide. After sufficiently high pressure builds up in the precharge, the projectile is released by energizing an electromechanical switch (not shown in the drawings). The projectile 24 is then moved on tracks 42 by the accelerator 26, as shown in FIG. 2. For structural stability considerations, the accelerator 26 is connected to two accelerator rods 36 and 36' on respective ends 34 and 34', as shown in FIG. 3. Pistons 38 and 38' move backward and forward inside accelerator tanks 40 and 40' respectively, thus moving the accelerator on tracks 44, which in turn moves the projectile 24 on tracks 42. As shown in FIG. 2 and FIG. 3, the accelerator is a yoke made of a light material, such as aluminum tubes to make it strong and light. The moving accelerator, upon collision with the shock absorbers 46 and 46', is disengaged from the projectile 24, which keeps on moving until it hits end 48 of piston 14 and generates a compression wave, which travels through an incompressible fluid, such as water, filling the tank 12. The projectile 24 reverses its direction of motion on tracks 42 upon collision with piston 14 and is slowed down by shock absorber 50 of FIG. 2. The shape of the piston has a constant stress design and it does not bend over when the fast moving projectile 24 hits it. The amplitude of the pressure wave generated in the medium filling the tank 12 is measured by gauges 25 and 27 housed inside the tank; the time required for the pressure wave to travel the distance between the two gauges provides a measure of velocity. The tank 12 also has provisions to house a transducer 22 which is under test.

Any distortion of the pressure wave due to any reflections at end 20 of tank 12 is limited by using a reflection absorber 18 as shown in FIG. 4. The reflection absorber 18 is mounted on the inside wall 52 of end 20 of the tank 12. Wall 54 of the reflection absorber is secured to the inner wall 52 of end 20 of tank 12 in a conventional manner which is not shown in the drawings. A flexible diaphragm 56 is secured to bottom portion 58 and top portion 60 of the reflection absorber 18 by screws 62 and 64 respectively. An air valve 66 is provided in bottom portion 58 of the reflection absorber and any desirable pressure can be maintained inside the reflection absorber. When a pressure wave hits the diaphragm 56, it pushes the diaphragm toward the wall 54 of the reflection absorber, thus compressing the air inside the reflection absorber and thereby limiting any appreciable reflection of the pressure wave.

Thus, in a pressure simulator of the instant invention, an accelerator is coupled to a projectile and is moved by a precharge taking the projectile therewith. Before the projectile hits a piston inside a tank filled with an incompressible fluid, it is decoupled from the accelerator. The collision between the moving projectile and the piston produces a pressure wave in the fluid filling the tank. The parameters of the pressure wave so generated are measured by gauges housed inside the tank. Any reflection of the pressure wave when it reaches the extreme end of the tank is avoided by securing a reflection absorber at that end of the tank.

Obviously many modifications and variations of the present invention are possible in the light of the above teachings. It is therefore to be understood that within the scope of the appended claims the invention may be practiced otherwise than as specifically described:

We claim:

1. A hydrodynamic shock simulator for generating pressure waves which comprises:
   a base;
   a fluid tight tank having a first end and a second end mounted on said base;
   a first piston mounted proximate the first end of said tank, said first piston having one end inside said tank and the other end outside said tank;
   a reflection absorber mounted inside said tank proximate said second end of said tank;
   a projectile movably mounted on said base, said projectile being collinear with said first piston;
   an accelerator having a first end and a second end, said first end of said accelerator being disengagably attached to said projectile, said accelerator and said projectile being reciprocable relative to said tank;
   an accelerator rod having a first end and a second end, said first end of said accelerator rod being connected to said second end of said accelerator;
   a second piston secured to said second end of said accelerating rod;
   an accelerator tank having a length greater than the length of said accelerator rod and having said second piston mounted inside said accelerator tank proximate one end thereof, said fluid tight tank and said accelerator tank having their axes generally parallel;
   a precharge of an inert gas mounted inside said accelerator tank; and
   a shock absorber mounted proximate said fluid tight tank between said accelerator and said accelerator tank, and collinear with said accelerator.

2. The simulator of claim 1 wherein said reflection absorber comprises a flexible diaphragm mounted on a housing secured to the inside wall of said fluid tight tank proximate second end thereof.

3. The simulator of claim 2 which further comprises a plurality of pressure gauges housed inside said fluid tight tank for measuring amplitude and velocity of said pressure waves.

4. The simulator of claim 3 wherein said inert gas is carbon dioxide.

5. The simulator of claim 3 wherein said projectile is movable on a first plurality of tracks.

6. The simulator of claim 5 wherein said accelerator is movable on a second plurality of tracks generally parallel to said first plurality of tracks.

* * * * *